United States Patent Office 3,138,404
Patented June 23, 1964

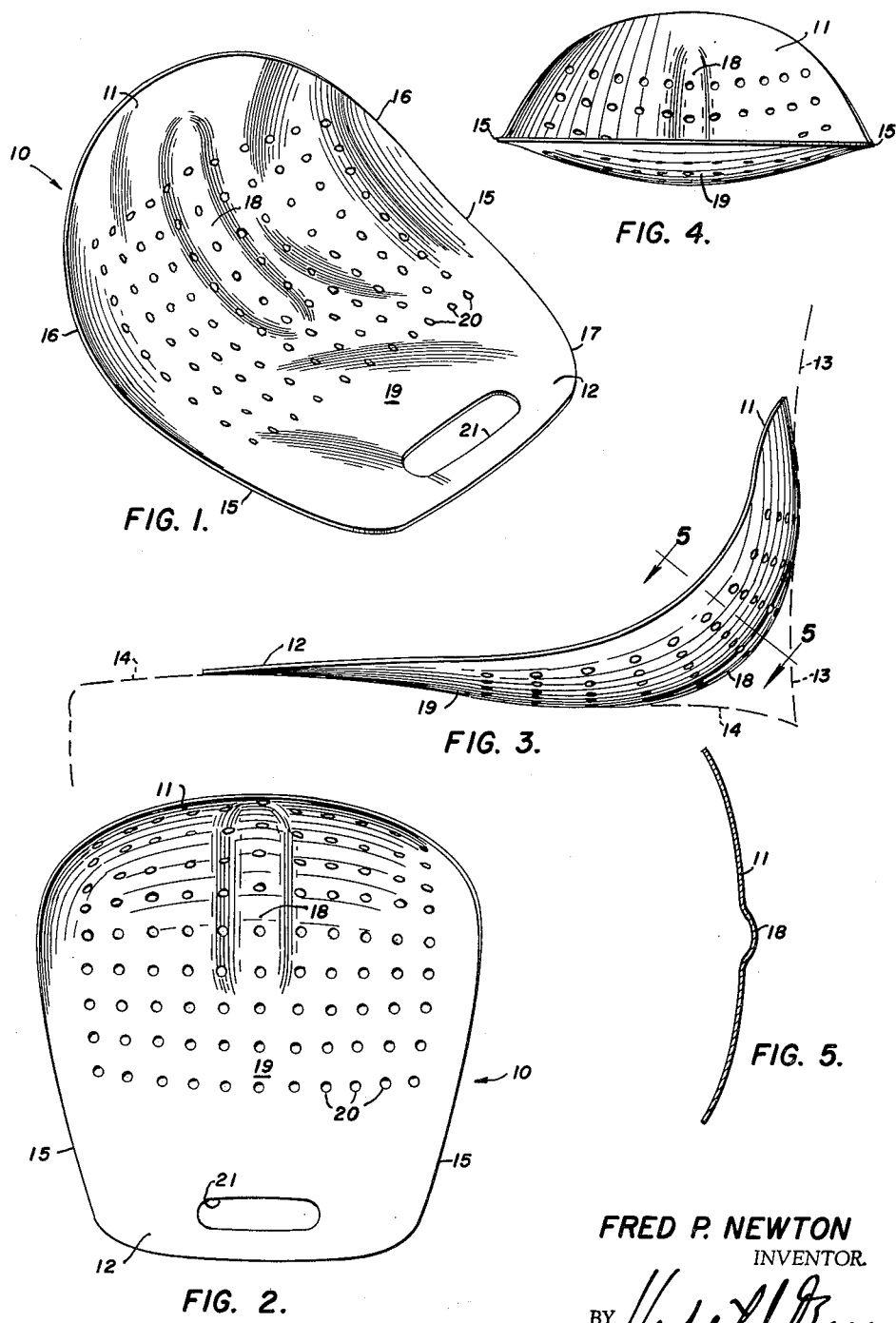

3,138,404
AUXILIARY BODY SUPPORT FOR VEHICLE SEATS
Fred P. Newton, Gainesville, Tex., assignor to Relaxo-Bak, Inc., Gainesville, Tex., a corporation of Texas
Filed July 29, 1963, Ser. No. 298,100
1 Claim. (Cl. 297—230)

This invention relates to body supports for use on cushioned seats and this application is a continuation in part of my copending application Serial No. 218,032, filed August 20, 1962, now abandoned.

Resilient seats, such as those used in automobiles, frequently become uncomfortable after long periods of time because the lower dorsal parts of the innominate bone in contact with the resilient seat become points of pressure with resulting discomfort. It is an object of the present invention to comfortably distribute body weight over a solid support, and at the same time have the primary benefits of a resilient cushion.

Another objection to riding on a resilient seat such as usually provided in vehicles is pressure on the coccyx which may become extremely uncomfortable. It is another object of the invention to provide a body conforming support for use on a cushion, which support is relieved where it makes contact with the coccyx area of the body.

Coccyx and sacral nerve relieving seats for cushions have been proposed heretofore but their constructions were such that they increased internal pressure in hemorrhoids and were, therefore, objectionable. A further object of the invention is to provide an auxiliary body support having provision for relieving pressure at the coccyx without increasing strain in adjacent parts of the body.

Generally, the invention is directed to a body conforming rigid or semi-rigid shell like member for use on a cushion, and which member is constructed to relieve pressure at the lower end of the spine and yet support the small of the back, the hips and thighs.

These and other objects will become apparent from the following description and accompanying drawing, wherein:

FIGURE 1 is a perspective view of a body support in accordance with the invention; FIGURE 2 is a top plan view; FIGURE 3 is a side elevational view; FIGURE 4 is a front elevational view, and FIGURE 5 is a sectional view taken on line 5—5 of FIGURE 3.

The auxiliary body support shown is comprised of a single generally cup shaped body 10 of rigid or semi-rigid sheet material, preferably of synthetic resin such as reinforced polyester or phenyl formaldehyde; or the material may be metal, for example, sheet aluminum.

Generally, the body 10 is cup shaped and wherein the back 11 and leg portions 12 generally conform with the back 13 and cushion 14 of a resilient vehicle seat. The sides 15 partially support the hips, whereas the leg supporting portion 12 is sufficiently long enough to substantially support the thighs. The back portion 11 is sufficient height to support the small of the back and those portions of the body periphery connecting the sides 15 with the top of the back are round, at 16, to prevent points of pressure where the periphery makes contact with the body. Similarly, those portions of the periphery between the sides 15 and the front of the leg support portion 12 are round, at 17, for the same reason.

A feature of the invention is the arcuate concave relief portion 18 in the center of the back 11 portion and extending down to but not including the horizontal seat portion 19 at the rear of the leg portion 12. As best shown in FIGURES 1 and 4, the relief portion 18 does not extend all the way to the top of the back portion 11. The seat portion 19 and back portion 11 are perforated, at 20, and a hand holding slot 21 is included in the leg portion 12 near and parallel with the front edge thereof.

The described construction is slidable and turnable on the cushion 14, and rests against the seat back 13. The configuration not only supports the back, hips and legs, but relieves pressure at the coccyx without strain on contiguous parts of the body.

The invention is not limited to the exemplary construction herein shown and described, but may be made in various ways within the scope of the appended claim.

What is claimed is:

In combination with a seat having a cushioned back portion and a cushioned seat portion, a body support resting on and slidably movable on said seat portion and in contact with said back portion, said body support being comprised of a rigid body of sheet material generally cup shaped with a vertical back portion curving into a substantially horizontal seat portion with rounded side portions between said vertical back and horizontal seat portions, said back seat and side portions being shaped to fit the user's hips, small of his back and his thighs, said back portion including a concave relief portion at the lower center area thereof, said relief being arcuate in cross section and terminating above said horizontal seat portion to relieve pressure on the user's coccyx, and at the same time providing riding comfort, reduced fatigue and permit pivoting of said body support while the user is seated therein.

References Cited in the file of this patent

UNITED STATES PATENTS

| | | |
|---|---|---|
| 574,503 | Van Meter | Jan. 5, 1897 |
| 1,827,124 | Trudo | Oct. 13, 1931 |
| 1,948,341 | Dujardin | Feb. 20, 1934 |
| 2,117,821 | Parker | May 17, 1938 |
| 2,847,061 | Morton | Aug. 12, 1958 |
| 2,855,986 | Engelen | Oct. 14, 1958 |

FOREIGN PATENTS

| | | |
|---|---|---|
| 858,246 | Great Britain | Jan. 11, 1961 |
| 1,080,256 | France | May 26, 1954 |